UNITED STATES PATENT OFFICE.

LEO HELLER, OF TEPLITZ, AUSTRIA-HUNGARY.

PROCESS AND MEANS FOR SECURING METALLIC COATS ON CERAMIC SURFACES.

1,126,211. Specification of Letters Patent. Patented Jan. 26, 1915.

No Drawing. Application filed March 24, 1914. Serial No. 826,951.

*To all whom it may concern:*

Be it known that I, LEO HELLER, a citizen of the Austro-Hungarian Empire, and residing at Teplitz, Bohemia, Austria-Hungary, have invented a certain new and useful Improved Process and Means for Securing Metallic Coats on Ceramic Surfaces, of which the following is a specification.

This invention relates to the application of metal to ceramic bodies, and its object is to provide an improved process and means for causing metallic coats to adhere firmly on the surfaces of ceramic objects, such as those of porcelain, glass, terracotta, stoneware and the like.

My improved means consists of a mixture of approximately 5 parts linseed oil, 5 parts turpentine oil, 250 parts bone-black, 180 parts rosin and 420 parts chemically purified finely divided graphite. These ingredients are intimately mixed in a color-mill until the composition is adapted to be applied like a paint by a brush or the like on the ceramic surface.

My improved process of providing ceramic bodies with a firmly adhering metallic coat is carried into practice as follows:—A coating of the described composition applied to the surface of the ceramic body is allowed to dry in the air, whereupon the coated object is heated to about 80° C. in an enameling stove. On cooling, the object thus coated is highly polished, preferably by means of a rapidly rotating fiber brush, whereupon a coat of metal is electrolytically deposited on it.

The intermediate layer of the described composition not only constitutes a specially good connection between the ceramic surface and the metallic coat, but it possesses very great conductivity and is adapted for having copper and nickel coats applied to it.

I claim:—

1. Means for causing metallic coats to adhere firmly on ceramic surfaces, composed of a finely ground mixture of approximately 5 parts linseed oil, 5 parts turpentine oil, 250 parts bone-black, 180 parts rosin and 420 parts finely divided washed graphite.

2. A process of providing ceramic bodies with firmly adhering metallic coats consisting in coating the body with a composition composed of approximately 5 parts linseed oil, 5 parts turpentine oil, 250 parts bone-black, 180 parts rosin and 420 parts finely divided washed graphite, in allowing the coating to dry in the air, in then heating the coated body to about 80° C., in allowing the same to cool, in highly polishing the same, and in electrolytically depositing a coat of metal thereon.

In testimony whereof, I affix my signature in the presence of two witnesses.

LEO HELLER.

Witnesses:
  RUDOLPH FRICKE,
  DORIS KRAHL.

Copies of this patent may be obtained for five cents each, by addressing the "Commissioner of Patents, Washington, D. C."